United States Patent

Ebner et al.

[11] Patent Number: 5,946,450
[45] Date of Patent: Aug. 31, 1999

[54] PRINTER PIXEL SIZE AND TONER/INK CONSUMPTION REDUCTION SYSTEM

[75] Inventors: Fritz F. Ebner; Nagesh H. Narendranath, both of Rochester, N.Y.

[73] Assignee: Xerox Corporation, Stamford, Conn.

[21] Appl. No.: 08/720,101

[22] Filed: Sep. 27, 1996

[51] Int. Cl.⁶ .............................. H04N 1/46; G06F 15/00
[52] U.S. Cl. .................... 395/109; 395/102; 358/515; 358/516
[58] Field of Search ............................. 395/102, 106, 395/109, 112, 114; 358/298, 456, 457, 459, 466, 515, 518, 516, 519, 529; 345/125, 501, 508

[56] References Cited

U.S. PATENT DOCUMENTS 4,521,805  6/1985  Ayata et al. ..................... 358/75
4,553,172  11/1985  Yamada et al. .................. 358/280

FOREIGN PATENT DOCUMENTS

0665675A2  1/1995  European Pat. Off. .

Primary Examiner—Edward L. Coles
Assistant Examiner—Mark E. Wallerson

[57] ABSTRACT

A system for reducing toner or ink consumption in rendering images, in which a transfer function is used to modify screening of the image to be rendered. Rendering systems including the use of single or multiple colors can employ the present invention. An algorithm is used in the present system to read in an arbitrary halftone dot and for each pixel in the halftone cell the output is a replicate of the threshold, Ta or Tb, surrounded by three pixels of white thresholds, a smooth transition from white to the now reduced maximum area coverage (such as 25%), while creating or maintaining the appearance of image uniformity at this reduced maximum area coverage.

4 Claims, 4 Drawing Sheets

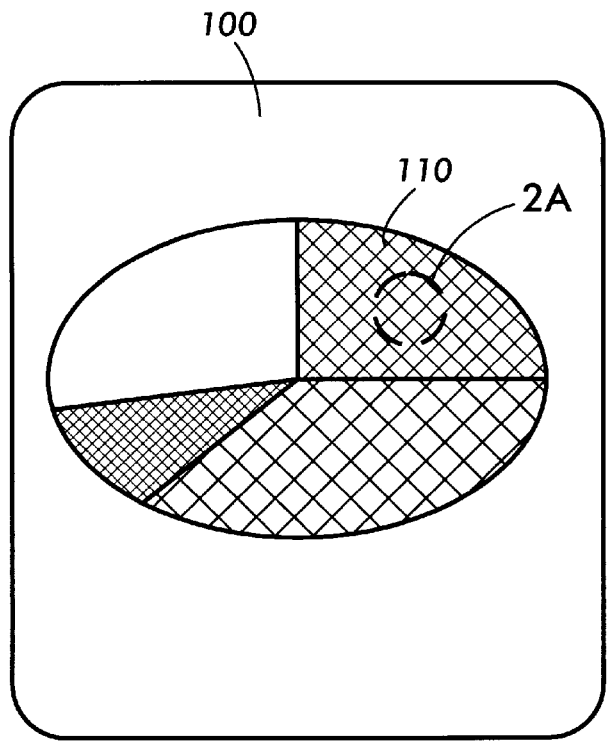
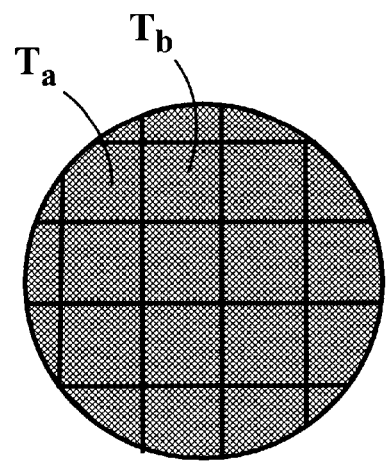
FIG. 2
FIG. 2A
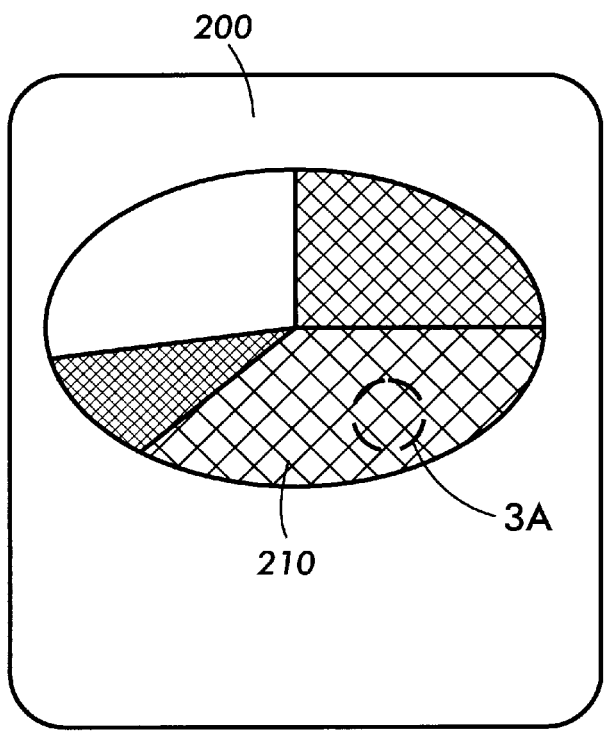
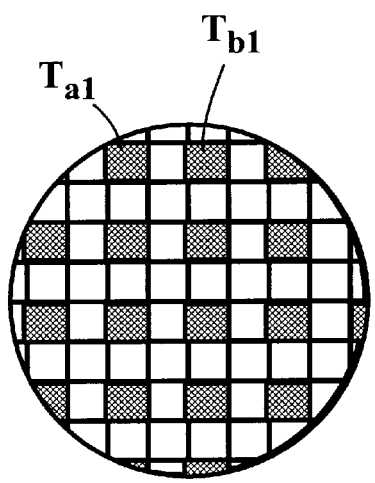
FIG. 3
FIG. 3A

PRINTER PIXEL SIZE AND TONER/INK CONSUMPTION REDUCTION SYSTEM

The present invention relates to a system for reducing the size of rendered pixels and/or the consumption of toner or ink in color printers and copiers, and more particularly, to an apparatus and method for reducing the size of pixels imaged for one or more color separations, so as to lower toner/ink usage while maintaining, improving and/or enhancing full color output text and image quality according to a specialized imaging system.

In the process of digital electrostatographic printing, an electrostatic charge pattern is formed on latent image corresponding to an original or insulating medium. A viewable record is then produced by developing the latent image with particles of granulated material to form a powder image thereof. Thereafter, the visible powder image is fused to the insulating medium, or transferred to a suitable support material and fused thereto. Development of the latent image is achieved by bringing a developer mix into contact therewith. Typical developer mixes generally comprise dyed or colored thermoplastic particles of granulated material known in the art as toner particles, which are mixed with carrier granules, such as ferromagnetic granules. When appropriate, toner particles are mixed with carrier granules and the toner particles are charged tirboelectrically to the correct polarity. As the developer mix is brought into contact with the electrostatic latent image, the toner particles adhere thereto. However, as toner particles are depleted from the developer mix, additional toner particles must be supplied.

In the operation of an electrophotographic copier or printer, particularly color machines, it is highly desirable to have means for altering rendered image color saturation for a number of reasons. In the case of color printers, it is highly desirable that in certain circumstances that rendered pixel size and toner consumption be reduced, or that less saturated colors be employed in rendering certain images so as to produce a more desirable output. In some situations, rendered output image quality or desirability can be enhanced by the system of the present invention.

Various systems have been employed to include those set forth in the following disclosures which may be relevant to various aspects of the image rendering systems of the present invention:

U.S. Pat. No. 4,553,172

Patentee: Yamada et al.

Issued: Nov. 12, 1985

U.S. Pat. No. 4,521,805

Patentee: Ayata et al.

Issued: Jun. 4, 1985

EPO-0 665 675 A2

Applicant: Hewlett-Packard Company

Priority Date: Jan. 27, 1994

U.S. Pat. No. 4,553,172 discloses scanning and recording an original picture and a character document. Picture signals and character signals both generated by the scanning are arranged in data formats of the same word length.

U.S. Pat. No. 4,521,805 discloses a printing apparatus which has at least one first recording head and at least one second recording head. These recording heads allow recording in binary mode, halftone mode, normal mode, and fine mode. A printing system has at least two recording units. One recording unit has a plurality of recording heads for recording in yellow, cyan and magenta, and the other recording unit has a recording head for recording in black.

EPO-0 665 675 A2 discloses a color printer system whereby an interactive user interface allows a choice between on-"button" automatic control of color output or multibutton control of color output, with both automatic and manual options providing independent control for color halftoning and for color correction based on the types of objects to be printed.

In accordance with one aspect of the present invention, there is provided a method for reducing toner consumption in a printing system while rendering a halftoned image area on an output sheet according to a set of digitized pixels. The method includes: accepting the digitized pixels according to a full resolution thresholded halftone pixel having a maximum pixel area coverage "m"; replicating the full resolution thresholded halftone threshold into a fractional area "f" of a reduced resolution pixel having a total pixel area equal to the maximum pixel area coverage of the full resolution thresholded halftone pixel; replacing a difference between said maximum pixel area coverage "m" and said fractional area "f" of a reduced resolution pixel with a white thresholded pixel area "w"; and producing an output image with the reduced resolution pixel and the white thresholded pixel.

In accordance with another aspect of the present invention, there is provided a printing system including a processor for reducing toner consumption when rendering a halftoned image area on an output sheet according to a set of digitized pixels. The printing system includes: a data input processor accepting said digitized pixels according to a full resolution thresholded halftone pixel having a maximum pixel area coverage "m"; a replication processor for replicating the full resolution thresholded halftone threshold into a fractional area "f" of a reduced resolution pixel having a total pixel area equal to the maximum pixel area coverage of the full resolution thresholded halftone pixel; a transfer processor for generating a white thresholded pixel area "w" of a size equal to a difference between said maximum pixel area coverage "m" and said fractional area "f" of a reduced resolution pixel; and a print engine for rendering the reduced resolution pixel areas and the white thresholded pixel areas on the output sheet.

Other features of the present invention will become apparent as the following description proceeds and upon reference to the drawings, in which:

FIGS. 2 and 2A are exemplary output showing a color reduction output without a reduced pixel size and toner/ink consumption system in use;

FIGS. 3 and 3A are exemplary output showing a color reduction output with a reduced pixel size and toner/ink consumption system in use;

Figure 4:
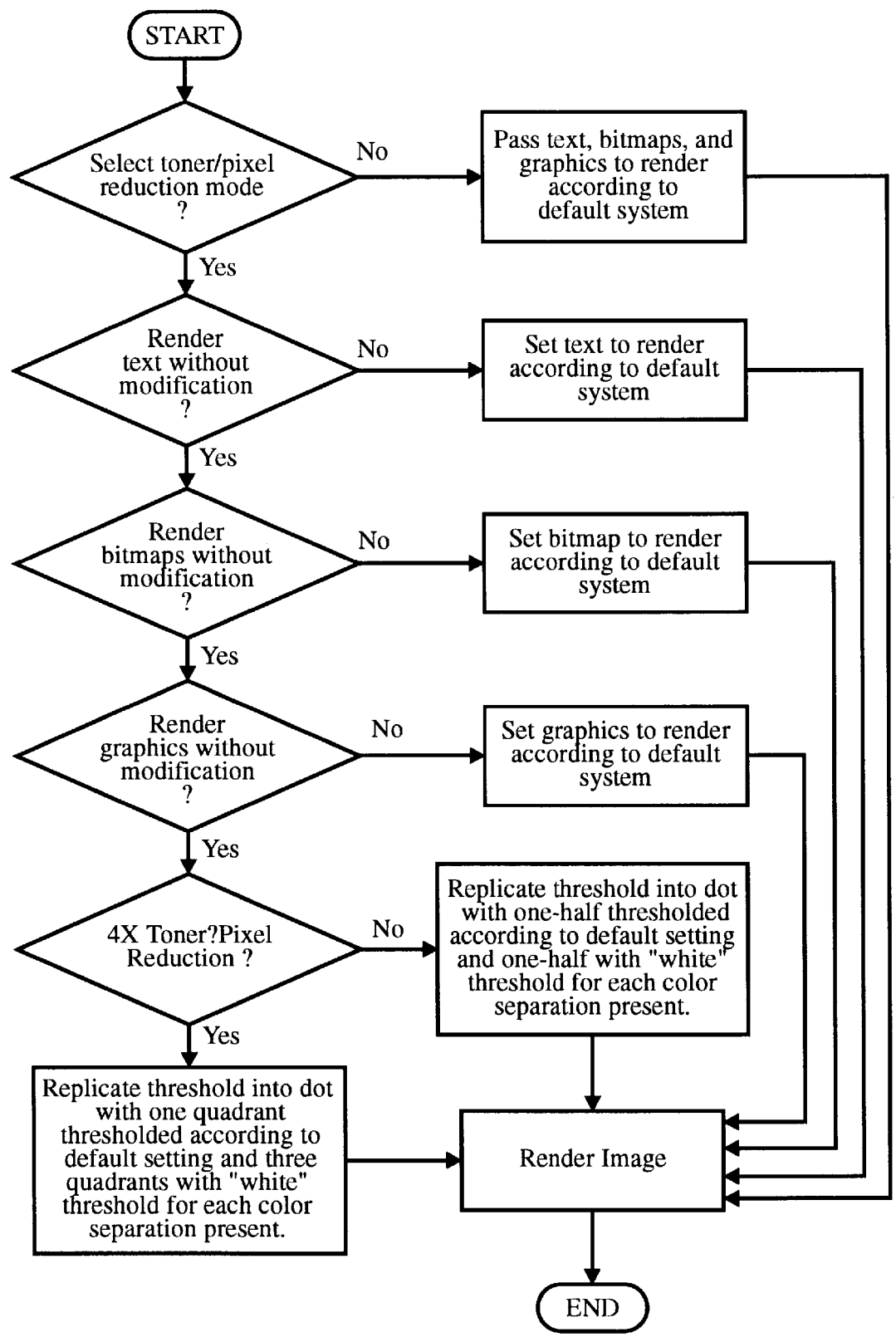
Figure 5:
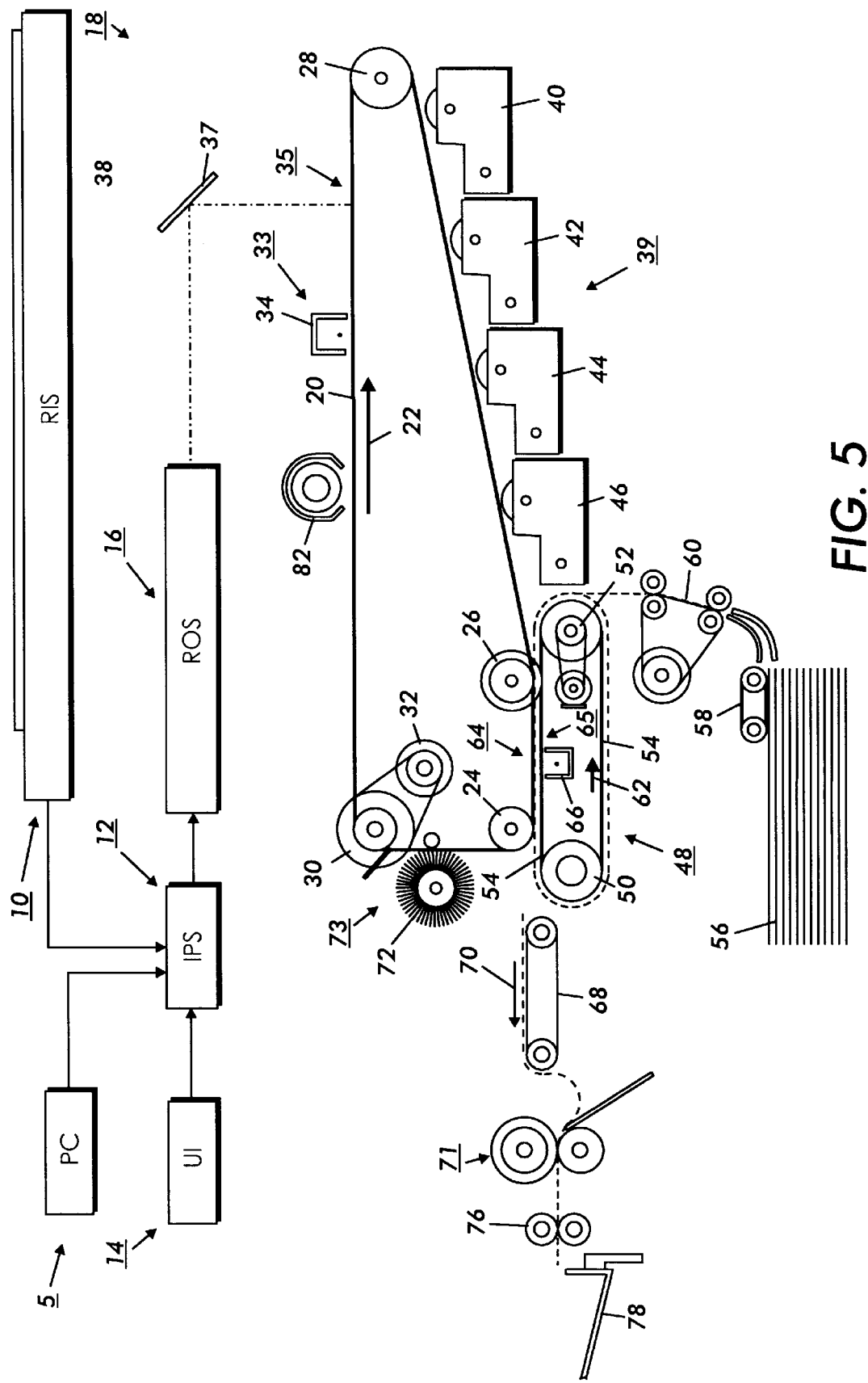

FIG. 4 flowchart showing another embodiment of the pixel size and toner/ink consumption reduction system of the present invention; and FIG. 5 is a schematic elevational view showing an exemplary color xerographic printing/copying machine and networked PC system incorporating features of the present invention therein.

While the present invention will hereinafter be described in connection with preferred embodiments thereof, it will be understood that it is not intended to limit the invention to these embodiments. On the contrary, it is intended to cover all alternatives, modifications and equivalents, as may be included within the spirit and scope of the invention as defined by the appended claims.

For a general understanding of the features of the present invention, reference is made to the drawings. FIG. 5 is a schematic elevational view showing an exemplary electrophotographic printing/copying machine and a networked PC which may incorporate features of the present invention therein. It will become evident from the following discussion that the system of the present invention is equally well suited for use in a wide variety of printing and copying systems, and therefore is not limited in application to the particular system(s) shown and described herein. An ESS (electronic subsystem) or image processing station (both referred to as IPS), indicated generally by the reference numeral 12, contains data processing and control electronics which prepare and manage the image data flow to a raster output scanner (ROS), indicated generally by the reference numeral 16. A network of one or more personal computers (PC), indicated generally by the reference numeral 5, is shown interfacing/in communication with IPS 12. A user interface (UI), indicated generally by the reference numeral 14, is also in communication with IPS 12.

UI 14 enables an operator to control and monitor various operator adjustable functions and maintenance activities. The operator actuates the appropriate keys of UI 14 to adjust the parameters of the copy. UI 14 may be a touch screen, or any other suitable control panel, providing an operator interface with the system. The output signal from UI 14 is transmitted to IPS 12. UI 14 may also display electronic documents on a display screen (not shown in FIG. 5), as well as carry out the image rendering system of the present invention as described in association with FIGS. 1 through 4 below.

As further shown in FIG. 5, a multiple color original document 38 may be positioned on (optional) raster input scanner (RIS), indicated generally by the reference numeral 10. The RIS contains document illumination lamps, optics, a mechanical scanning drive, and a charge coupled device (CCD array) or full width color scanning array. RIS 10 captures the entire image from original document 38 and converts it to a series of raster scan lines and moreover measures a set of primary color densities, i.e., red, green and blue densities, at each point of the original document. RIS 10 may provide data on the scanned image to IPS 12, indirectly to PC 5 and/or directly to PC 5.

Documents in digital or other forms may be created, screened, modified, stored and/or otherwise processed by PC 5 prior to transmission/relay to IPS 12 for printing on printer 18. The display of PC 5 may show electronic documents on a screen (not shown in FIG. 5). IPS 12 may include the processor(s) and controller(s) (not shown in FIG. 5) required to perform the image rendering system of the present invention.

IPS 12 also may transmit signals corresponding to the desired electronic or scanned image to ROS 16, which creates the output copy image. ROS 16 includes a laser with rotating polygon mirror blocks. The ROS illuminates, via mirror 37, the charged portion of a photoconductive belt 20 of a printer or marking engine, indicated generally by the reference numeral 18, at a rate of about 400 pixels per inch, to achieve a set of subtractive primary latent images. (Other implementations may include other pixel resolutions of varying types 600×600 dpi, 1200×1200 dpi or even asymmetrical resolutions, such as 300×1200 dpi.) The ROS will expose the photoconductive belt to record three or four latent images which correspond to the signals transmitted from IPS 12. One latent image is developed with cyan developer material. Another latent image is developed with magenta developer material and the third latent image is developed with yellow developer material. A black latent image may be developed in lieu of or in addition to other (colored) latent images. These developed images are transferred to a copy sheet in superimposed registration with one another to form a multicolored image on the copy sheet. This multicolored image is then fused to the copy sheet forming a color copy.

With continued reference to FIG. 5, printer or marking engine 18 is an electrophotographic printing machine. Photoconductive belt 20 of marking engine 18 is preferably made from a photoconductive material. The photoconductive belt moves in the direction of arrow 22 to advance successive portions of the photoconductive surface sequentially through the various processing stations disposed about the path of movement thereof. Photoconductive belt 20 is entrained about rollers 23 and 26, tensioning roller 28, and drive roller 30. Drive roller 30 is rotated by a motor 32 coupled thereto by suitable means such as a belt drive. As roller 30 rotates, it advances belt 20 in the direction of arrow 22.

Initially, a portion of photoconductive belt 20 passes through a charging station, indicated generally by the reference numeral 33. At charging station 33, a corona generating device 34 charges photoconductive belt 20 to a relatively high, substantially uniform potential.

Next, the charged photoconductive surface is rotated to an exposure station, indicated generally by the reference numeral 35. Exposure station 35 receives a modulated light beam corresponding to information derived by RIS 10 having multicolored original document 38 positioned thereat. The modulated light beam impinges on the surface of photoconductive belt 20. The beam illuminates the charged portion of the photoconductive belt to form an electrostatic latent image. The photoconductive belt is exposed three or four times to record three or four latent images thereon.

After the electrostatic latent images have been recorded on photoconductive belt 20, the belt advances such latent images to a development station, indicated generally by the reference numeral 39. The development station includes four individual developer units indicated by reference numerals 40, 42, 44 and 46. The developer units are of a type generally referred to in the art as "magnetic brush development units." Typically, a magnetic brush development system employs a magnetizable developer material including magnetic carrier granules having toner particles adhering triboelectrically thereto. The developer material is continually brought through a directional flux field to form a brush of developer material. The developer material is constantly moving so as to continually provide the brush with fresh developer material. Development is achieved by bringing the brush of developer material into contact with the photoconductive surface. Developer units 40, 42, and 44, respectively, apply toner particles of a specific color which corresponds to the complement of the specific color separated electrostatic latent image recorded on the photoconductive surface.

The color of each of the toner particles is adapted to absorb light within a preselected spectral region of the electromagnetic wave spectrum. For example, an electrostatic latent image formed by discharging the portions of charge on the photoconductive belt corresponding to the green regions of the original document will record the red and blue portions as areas of relatively high charge density on photoconductive belt 20, while the green areas will be reduced to a voltage level ineffective for development. The charged areas are then made visible by having developer unit 40 apply green absorbing (magenta) toner particles onto the electrostatic latent image recorded on photoconductive belt 20. Similarly, a blue separation is developed by developer unit 42 with blue absorbing (yellow) toner particles, while the red separation is developed by developer unit 44 with red absorbing (cyan) toner particles. Developer unit 46 contains black toner particles and may be used to develop the electrostatic latent image formed from a black and white original document. Each of the developer units is moved into and out of an operative position. In the operative position, the magnetic brush is substantially adjacent the photoconductive belt, while in the nonoperative position, the magnetic brush is spaced therefrom. During development of each electrostatic latent image, only one developer unit is in the operative position, the remaining developer units are in the nonoperative position.

After development, the toner image is moved to a transfer station, indicated generally by the reference numeral 65. Transfer station 65 includes a transfer zone, generally indicated by reference numeral 64. In transfer zone 64, the toner image is transferred to a sheet of support material, such as plain paper amongst others. At transfer station 65, a sheet transport apparatus, indicated generally by the reference numeral 48, moves the sheet into contact with photoconductive belt 20. Sheet transport 48 has a pair of spaced belts 54 entrained about a pair of substantially cylindrical rollers 50 and 53. A sheet gripper (not shown in FIG. 5) extends between belts 54 and moves in unison therewith. A sheet 25 is advanced from a stack of sheets 56 disposed on a tray. A friction retard feeder 58 advances the uppermost sheet from stack 56 onto a pre-transfer transport 60. Transport 60 advances the sheet (not shown in FIG. 5) to sheet transport 48. The sheet is advanced by transport 60 in synchronism with the movement of the sheet gripper. The sheet gripper then closes securing the sheet thereto for movement therewith in a recirculating path. The leading edge of the sheet (again, not shown in FIG. 5) is secured releasably by the sheet gripper. As belts 54 move in the direction of arrow 62, the sheet moves into contact with the photoconductive belt, in synchronism with the toner image developed thereon. In transfer zone 64, a corona generating device 66 sprays ions onto the backside of the sheet so as to charge the sheet to the proper magnitude and polarity for attracting the toner image from photoconductive belt 20 thereto. The sheet remains secured to the sheet gripper so as to move in a recirculating path for three cycles. In this way, three or four different color toner images are transferred to the sheet in superimposed registration with one another.

One skilled in the art will appreciate that the sheet may move in a recirculating path for four cycles when under color black removal is used. Each of the electrostatic latent images recorded on the photoconductive surface is developed with the appropriately colored toner and transferred, in superimposed registration with one another, to the sheet to form the multicolored copy of the colored original document. After the last transfer operation, the sheet transport system directs the sheet to a vacuum conveyor 68. Vacuum conveyor 68 transports the sheet, in the direction of arrow 70, to a fusing station, indicated generally by the reference numeral 71, where the transferred toner image is permanently fused to the sheet. Thereafter, the sheet is advanced by a pair of rolls 76 to a catch tray 78 for subsequent removal therefrom by the machine operator.

The final processing station in the direction of movement of belt 20, as indicated by arrow 22, is a photoreceptor cleaning apparatus, indicated generally by the reference numeral 73. A rotatably mounted fibrous brush 72 may be positioned in the cleaning station and maintained in contact with photoconductive belt 20 to remove residual toner particles remaining after the transfer operation. Thereafter, lamp 82 illuminates photoconductive belt 20 to remove any residual charge remaining thereon prior to the start of the next successive cycle. As mentioned above, the present invention is useful in xerographic printer hardware implementations (in which certain aspects of the system as outlined below have been tested) as well as other systems such as ink jet printers, plotters, computer displays or other systems.

In conjunction with FIGS. 1 through 4, the present invention will be generally be described in terms of its application to a printer or copier such as described above in association with FIG. 5. The descriptions that follow describe a embodiments of the present invention as may be implemented in a print engine that accepts a description of a page to be printed using various page description languages (PDLs). References herein to "printing" and other such terms that might otherwise be restricted to printed media applications are to be understood in the context of the broad applicability of the present invention to one skilled in the relevant arts or image processing in printing, visual output displays and like rendered media. Further, as shall be discussed later, embodiments of the invention which do not require that an image or document be described by a particular page description language (PDL) can also be applied with embodiments of the present invention.

Figure 1:
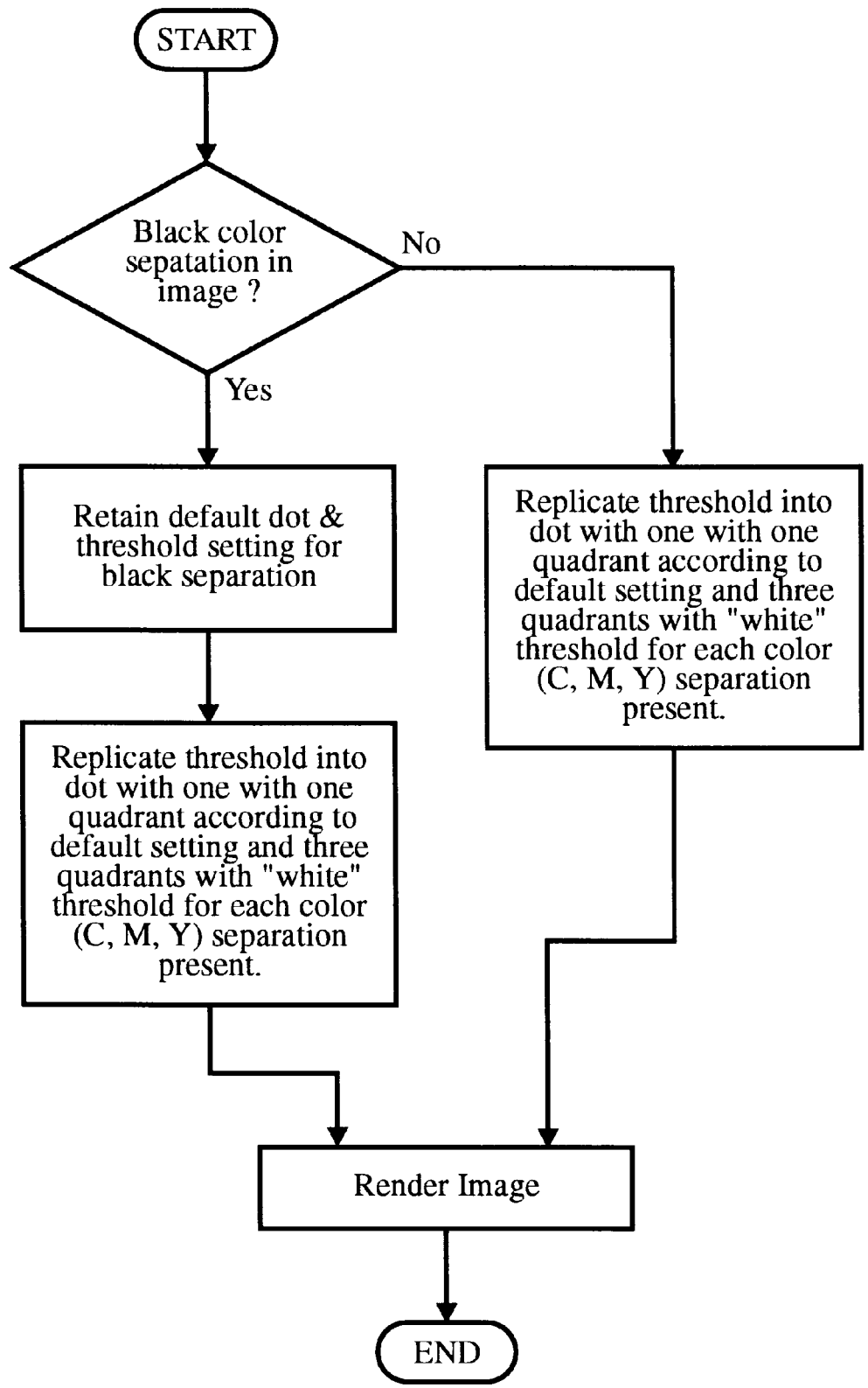
FIG. 1 is a flowchart showing an embodiment of the pixel size and toner/ink consumption reduction system of the present invention.

FIG. 1 is a flow chart of an exemplary toner consumption reduction system of the present invention. FIG. 1 outlines a digital version of the system of the present invention as applied to CMYK separations. The present invention employs the use of a halftone screen system to reduce the number of pixels imaged for a given separation. In one embodiment, whereby the screen is constructed from a "normal" screen together with three new thresholds the new thresholds are set so as to never turn on. The total cost of printer ownership (including the cost per page of printing colored or black and white documents) remains a key issue in the desirability of a particular desk top printer; the present invention thus provides for significant advantages by saving toner when draft quality is desired, or when the imaging application allows for equal or even improved image desirability over a standard or default (up to 100%) toner area coverage system. The two dimensional area of the sum of all quadrants of the new four quadrant dot is the same as the area of the original dot. The present invention thus permits the reduction in the toner consumption of printed color or black and white documents, while maintaining the overall hue of the colored documents produced. In some cases, more pleasing or desirable images may be rendered.

FIG. 1 shows an embodiment in which a response to a "Black separation in image?" query is automatically or manually generated and/or answered, so as to thereafter implement a full or partial toner/pixel area reduction system. The partial toner/pixel reduction system is implemented when a black separation or image is to be printed, in that the output quality of black text can be greatly (and undesirably) degraded in some uses or circumstances by adding white threshold portions to an image, as might be desirably employed when rendering a particular type of image or object. If no black separation is present in the image, then the threshold used to render the dot is replicated or transformed such that one quadrant of the new four quadrant dot is thresholded according to the original dot, and the other three quadrants are given a white threshold that is, not rendered).

The FIG. 1 embodiment of the system can significantly reduce toner/ink consumption by using a halftone screen which grows to a maximum of 25% of the maximum area coverage. In a halftone screen designed for a 600×600 dpi printer, a reduced halftone screen density rendering can also be employed in an isotropic or an anisotropic printer system. The screen used for the 600×600 dpi printer was developed from a 45 degree, 128 gray levels, 106 lpi dot. In FIGS. 2 and 2A, image 100 includes a graphic (such as clip art) portion 110. Each representative pixel (such as $T_a$ and $T_b$) are imaged in a standard or default manner. In FIGS. 3 and 3A, image 200 includes a graphic (such as clip art) portion 210, in which each pixel is rendered according to the system of the present invention, such that each representative pixel (such as $T_{a1}$ and $T_{b1}$) is thresholded in one quadrant of the new divided pixel, at a level of up to 25% of the maximum area coverage. An algorithm is used in the present system to read in an arbitrary halftone dot and for each pixel in the halftone cell the output is a replicate of the threshold, Ta or Tb, surrounded by three pixels of white thresholds, as illustrated in FIG. 3. This approach allows a smooth transition from white to the now reduced maximum area coverage (25%), while creating or maintaining the appearance of image uniformity at this reduced maximum area coverage. The resultant dot from the 45 degree, 128 gray levels, 106 lpi dot is a 45 degree dot, 128 gray levels with 53 lpi.

In the case of the PostScript page description language (PDL) applications, a gray value of 0 to black is set regardless of the halftone screen. To overcome this problem, a transfer function may be used, such that a gray value of 0 is substituted with a value of 1/255. This invention has the capability to reduce the toner consumption in all the color planes or to have maximum density in black, to improve black text quality, while still maintaining a smooth transitions to the maximum color in C, M and Y.

FIG. 4 shows an adaptable system for determining or differentially rendering different image object types with the toner/pixel reduction mode system of the present invention. Initially, a user determines (or an automatic determination is made) as to whether the toner/pixel reduction mode system of the present invention is to be implemented. If the answer is negative, then all image objects (such as text, bitmaps and graphics) are passed on to be rendered according to the default halftoning, colorization, (and so forth) system. If a user determines that toner/pixel reduction is desired, the user is thereafter permitted to select whether text should pass through the system without modification, (so that text that might become difficult to read if it were rendered with reduced toner is not modified). Thereafter, a user may additionally select whether to render bitmaps or pictorials without modification; if the user determines that to reduce toner used to print would result in an unacceptable rendering, then that user may select to bypass toner/pixel reduction for such bitmap images. Thereafter, a user is permitted to select among options as to the degree of toner/pixel reduction. For example, if 25% maximum area coverage (4×) reduction is desired, it may be selected; otherwise, a less aggressive reduction level, such as one-half (2×or 50%) toner reduction may be selected. The system of the present invention thereafter replicates the threshold of the reduced toner/pixel area coverage to be implemented so as to render the image according to the desired degree of reduction. (Other fractions/percentages of toner coverage, ⅓, ⅔, 40%, and so on) could also be used as the maximum area coverage. Each object type or all objects (according to the selected options) is rendered as an output image. Other modifications and implementations of the system of the present invention in which different object types, different degrees of toner/pixel reduction and other modifications are envisioned by the system of the present invention and may be automatically or manually implemented according to user preference.

While present invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

We claim:

1. A method for reducing toner consumption in a printing system, said method comprising the steps of:

(a) receiving digitized pixels;

(b) receiving a first halftone cell having a first number of pixels, a first resolution, and a maximum coverage area;

(c) creating a second halftone cell having a second number of pixels and a second resolution, the second resolution being distinct from the first resolution;

said step (c) including the substeps of, (c1) creating a threshold value for a determined number of pixels in the second halftone cell by replicating a threshold value associated with a pixel in the first halftone cell, and (c2) creating a threshold value for any remaining pixels in the second cell by assigning a white threshold value thereto; and (d) producing an output image with the received digitized pixels and the second halftone cell.

2. The method as claimed in claim 1, wherein said substep (c1) creates a threshold value for 25% of the pixels in the second halftone cell by replicating a threshold value associated with a pixel in the first halftone cell and said substep (c2) creates a threshold value for 75% of the pixels in the second cell by assigning a white threshold value thereto.

3. The method as claimed in claim 1, wherein said substep (c1) creates a threshold value for 50% of the pixels in the second halftone cell by replicating a threshold value associated with a pixel in the first halftone cell and said substep (c2) creates a threshold value for 50% of the pixels in the second cell by assigning a white threshold value thereto.

4. The method as claimed in claim 1, wherein said substep (c1) creates a threshold value for 75% of the pixels in the second halftone cell by replicating a threshold value associated with a pixel in the first halftone cell and said substep (c2) creates a threshold value for 25% of the pixels in the second cell by assigning a white threshold value thereto.

* * * * *